(12) United States Patent
VanHorn

(10) Patent No.: US 10,667,886 B2
(45) Date of Patent: Jun. 2, 2020

(54) DENTAL END FORMING BURR

(71) Applicant: LittleJohn Kirk VanHorn, Sparks, NV (US)

(72) Inventor: LittleJohn Kirk VanHorn, Sparks, NV (US)

(\*) Notice: Subject to any disclaimer, the term of this patent is extended or adjusted under 35 U.S.C. 154(b) by 0 days.

(21) Appl. No.: 15/933,186

(22) Filed: Mar. 22, 2018

(65) Prior Publication Data

US 2018/0271618 A1 Sep. 27, 2018

Related U.S. Application Data

(60) Provisional application No. 62/477,254, filed on Mar. 27, 2017.

(51) Int. Cl.
| | | |
|---|---|---|
| *A61C 3/025* | (2006.01) | |
| *A61C 3/06* | (2006.01) | |
| *A61C 5/70* | (2017.01) | |
| *A61C 1/08* | (2006.01) | |

(52) U.S. Cl.
CPC ............ *A61C 3/025* (2013.01); *A61C 3/06* (2013.01); *A61C 1/082* (2013.01); *A61C 5/70* (2017.02)

(58) Field of Classification Search
CPC .. A61C 3/02; A61C 1/12; A61C 1/055; A61C 1/14; A61C 5/77; A61C 3/025; A61C 3/06; A61C 5/70; A61C 1/082
USPC ..... 433/165, 166, 32; 606/80; 408/199–233; 175/327–425; 422/37, 224; 279/76; 451/523–55
See application file for complete search history.

(56) References Cited

U.S. PATENT DOCUMENTS

| | | | | |
|---|---|---|---|---|
| 1,216,683 | A | * 2/1917 | Greenfield | A61C 8/0018 433/165 |
| 2,176,339 | A | 10/1939 | Henneman | |
| 3,979,829 | A | * 9/1976 | Lemos | A61C 3/02 433/165 |
| 5,120,223 | A | * 6/1992 | Weissman | A61C 3/02 433/215 |
| 2008/0085490 | A1 | * 4/2008 | Jabri | A61C 3/02 433/165 |
| 2010/0145341 | A1 | * 6/2010 | Ranck | A61B 17/1615 606/80 |
| 2012/0323243 | A1 | 12/2012 | Moon et al. | |

FOREIGN PATENT DOCUMENTS

| | | |
|---|---|---|
| JP | 2009118893 A | 6/2009 |
| WO | WO2016011660 A1 | 1/2016 |

\* cited by examiner

*Primary Examiner* — Sean M Michalski
*Assistant Examiner* — Mirayda A Aponte
(74) *Attorney, Agent, or Firm* — Plager Schack LLP; Mark H. Plager; Kara Verryt

(57) ABSTRACT

A dental burr for preparing tooth for fabrication may include a shank designed to engage with a dental handpiece; and a burr body extending from the shank. The burr body may have a lip distal from the shank, the lip defining an opening into a cavity within the burr body, the cavity being sized to accommodate a tooth; and an indented edge extending from an area of the burr body proximate to the lip to the lip, wherein an exterior surface of the indented edge, the lip, and an inner surface of the cavity be an abrasive surface. The burr body may also have at least one debris vent extending therethrough.

6 Claims, 4 Drawing Sheets

DENTAL END FORMING BURR

RELATED APPLICATION

This application claims priority to provisional patent application U.S. Ser. No. 62/477,254 filed on Mar. 27, 2017, the entire contents of which is herein incorporated by reference.

BACKGROUND

The embodiments herein relate generally to dental devices, and more particularly, to a dental burr for removing tooth structure.

Dentists use burrs powered by an actuator to form/shape/prepare a tooth and/or synthetic abutment by free-hand (a.k.a. crown prep) prior to fitting an artificially fabricated crown to the prepared tooth. These burrs conventionally include a shank and a head, wherein the head may comprise a myriad of shapes and the shank is used to attach the burr to a dental handpiece. The handpiece may employ air propulsion and turbine or electric motor controlled with an actuator (rheostat) that in turn allows the burr to turn at a desired revolutions per minute (RPM) to allow for removal of the desired tooth structure.

Preparation of the tooth requires the dentist to abrade/grind away the tooth circumferentially and coronal to apically to achieve a desired shape and margin for artificial crown fabrication and placement. The free-hand crown preparation method is time consuming and does not always result in a good/desired shape for a host of reasons. While dental burrs exist, conventional dental burrs do not have the ability to effectively preserve adjacent dental tissues. Rather, traditional burrs can potentially cause damage or deleterious effects (iatrogenesis) to adjacent hard and soft tissues and/or structures (e.g. dental restorations).

Therefore, what is needed is an improved dental burr for the formation/preparation of a tooth for fabrication and ease of placement of artificial crowns, wherein the dental burr prepares the tooth while simultaneously preserving adjacent dental tissue.

SUMMARY

Some embodiments of the present disclosure include a dental burr for preparing a tooth for fabrication may include a shank designed to engage with a dental handpiece; and a burr body extending from the shank. The burr body may have a lip distal from the shank, the lip defining an opening into a cavity within the burr body, the cavity being sized to accommodate a tooth; and an indented edge extending from an area of the burr body proximate to the lip to the lip, wherein an exterior surface of the indented edge, the lip, and an inner surface of the cavity be an abrasive surface. The burr body may also have at least one debris vent extending therethrough.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
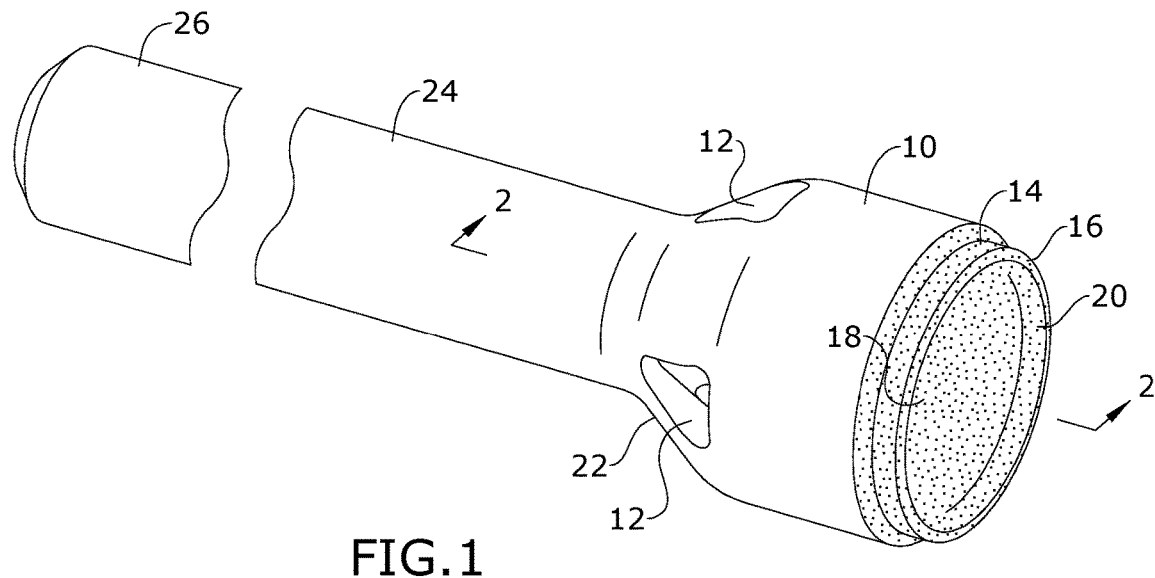
FIG. 1 is a perspective view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a dental burr for preparing and shaping a tooth and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. Shank
b. Burr
c. Indented Edge
d. Abrasive Material
e. Cavity

The various elements of the device of the present disclosure may be related in the following exemplary fashion. It is not intended to limit the scope or nature of the relationships between the various elements and the following examples are presented as illustrative examples only.

By way of example, and referring to FIGS. 1-10, some embodiments of the present disclosure include a dental burr for preparing tooth for crown fabrication, the dental burr comprising a burr body 10 extending from a shank 24 designed to engage with a dental handpiece 28, wherein the burr body 10 comprises lip 16 distal from the shank 24, the lip 16 defining an opening into a cavity 18 within the burr body 10, the cavity 18 being sized to accommodate a tooth 82; and an indented edge 14 extending from an area of the burr body 10 proximate to the lip 16 to the lip 16, wherein an exterior surface of the indented edge 16, the lip 16, and an inner surface of the cavity 18 comprises an abrasive surface 20. The burr body 10 may also comprise at least one debris vent 12 extending through the burr body 10, such that when in use, the debris from the tooth 82 being prepared may exit the burr body 10 to prevent or reduce the likelihood that the cavity 18 gets clogged with debris.

As shown in the Figures, the burr body 10 may gradually taper from a widest width to the width of the shank 24. Thus a portion of the burr body 10 proximate to the shank 24 may comprise a rear body taper 22.

Figure 2A:
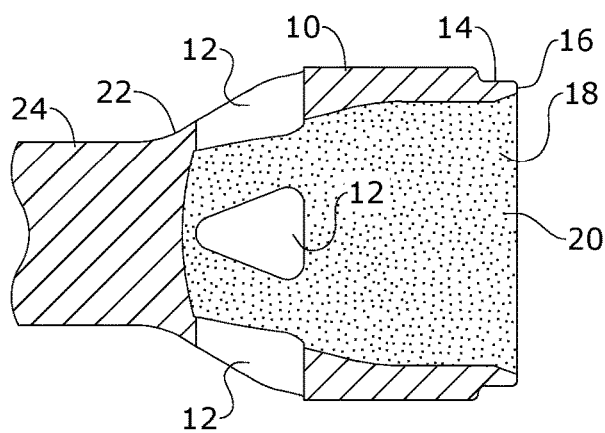
FIG. 2A is a section view of one embodiment of the present disclosure, taken along line 2-2 in FIG. 1.
Figure 2B:
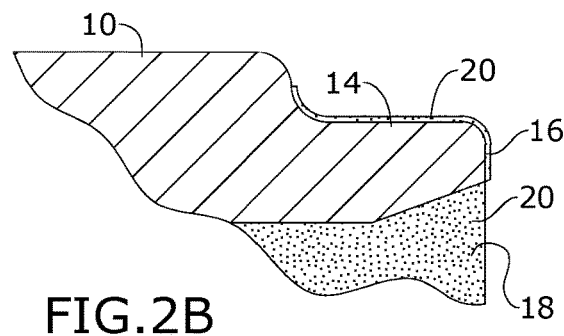
FIG. 2B is a detail section view of one embodiment of the present disclosure.

As shown in the Figures, the cavity may have a variety of shapes. For example, as shown in FIGS. 2A and 2B, the walls defining the cavity 18 may taper outward from a position proximate the shank 24 to the lip 16, wherein the lip 16 comprises a slightly feathered butt edge or margin.

Figure 5A:
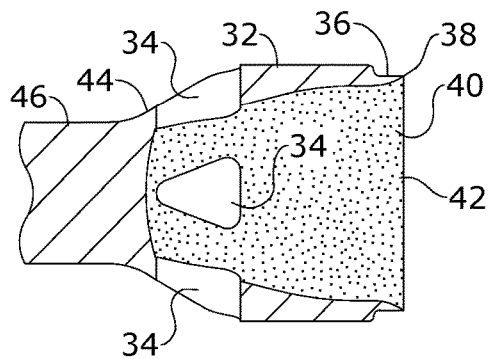
FIG. 5A is a section view of one embodiment of the present disclosure, taken along line 5-5 in FIG. 4.
Figure 5B:
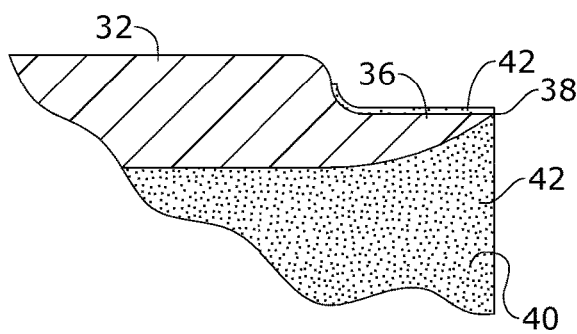
FIG. 5B is a detail section view of one embodiment of the present disclosure.

Alternatively, as shown in FIGS. 5A and 5B, the device may comprise a burr body 32 extending from a shank 46, wherein the burr body 32 comprises a rear body taper 44 extending from a widest width of the burr body 32 to the shank 46 a lip 38 distal from the shank 46, the lip 38 defining an opening into a cavity 40 sized to accommodate a tooth, an indented edge 36 leading from the widest width of the burr body 32 to the lip 38, wherein a diameter of the lip 38 is less than a diameter of the widest width of the burr body 32, an abrasive surface 42 applied to or built within the indented edge 36, lip 38, and internal surfaces of the cavity 42, and optional debris vent(s) 34 extending through the burr body 32, wherein the walls defining the cavity 42 may taper outward from a position proximate to the shank 46 to the lip 38, wherein the lip 16 comprises a chamfer edge or margin.

Figure 6A:
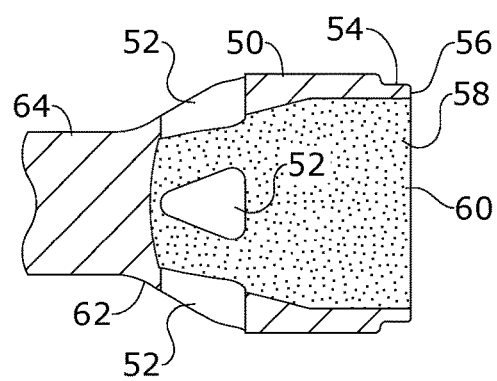
FIG. 6A is a section view of one embodiment of the present disclosure.
Figure 6B:
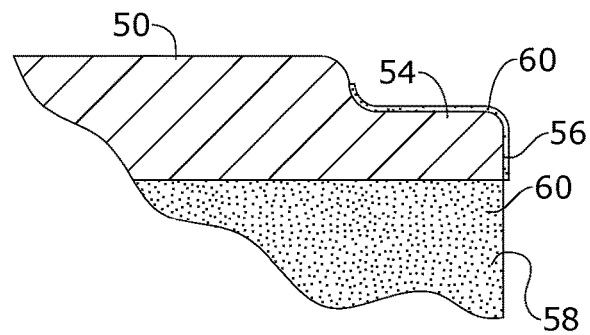
FIG. 6B is a detail section view of one embodiment of the present disclosure.

Yet another embodiment of the device of the present disclosure, as shown in FIGS. 6A and 6B, may comprise a burr body 50 extending from a shank 64, wherein the burr body 50 comprises a rear body taper 62 extending from a widest width of the burr body 50 to the shank 64, a lip 56 distal from the shank 64, the lip 56 defining an opening into a cavity 58 sized to accommodate a tooth, an indented edge 54 leading from the widest width of the burr body 50 to the lip 56, an abrasive surface 60 applied to or built within the indented edge 54, lip 56, and internal surfaces of the cavity 58, and optional debris vent(s) 52 extending through the burr body 50, wherein the walls defining the cavity 58 may taper outward from a position proximate to the shank 64 to the lip 56, wherein the lip 56 comprises a butt edge or margin.

Figure 7A:
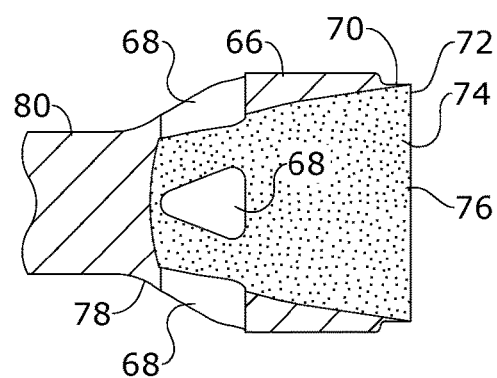
FIG. 7A is a section view of one embodiment of the present disclosure.
Figure 7B:
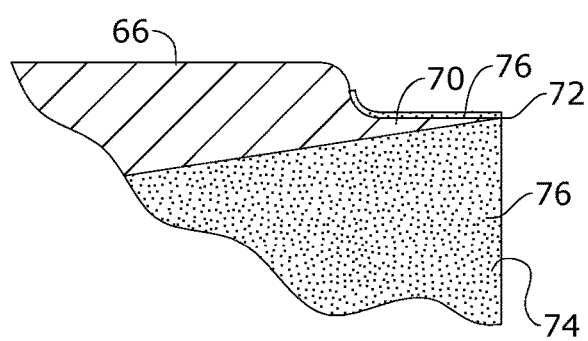
FIG. 7B is a detail section view of one embodiment of the present disclosure.

Another embodiment of the device of the present disclosure, as shown in FIGS. 7 and 7B, may comprise a burr body 66 extending from a shank 80, wherein the burr body 66 comprises a rear body taper 78 extending from a widest width of the burr body 66 to the shank 80, a lip 72 distal from the shank 80, the lip 72 defining an opening into a cavity 74 sized to accommodate a tooth, an indented edge 70 leading from the widest width of the burr body 66 to the lip 72, an abrasive surface 76 applied to or built within the indented edge 70, lip 72, and internal surfaces of the cavity 74, and optional debris vent(s) 68 extending through the burr body 66, wherein the walls defining the cavity 74 may taper outward from a position proximate to the shank 80 to the lip 72, wherein the lip 72 comprises a feather edge or margin.

Thus, in summary, the lip member may comprise a variety of shapes. For example the lip may be a member selected from the group consisting of a feathered edge, a 90 degree butt margin, a chamfer edge, and the like, including any margin inbetween.

Figure 3:
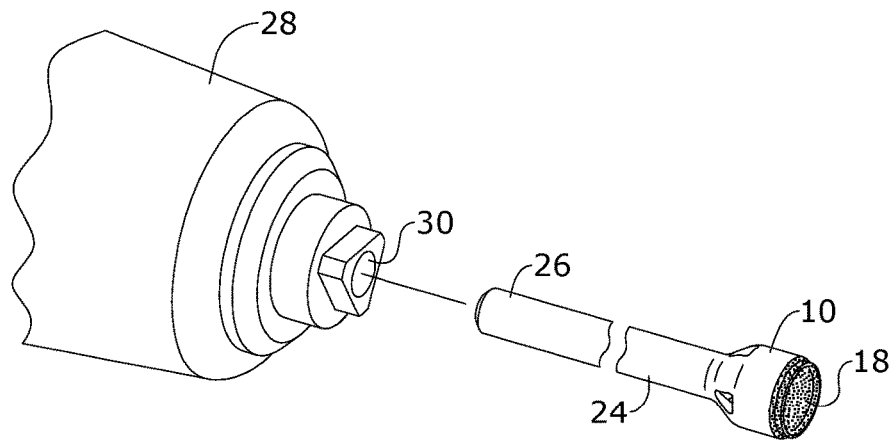
FIG. 3 is a perspective view of one embodiment of the present disclosure.
Figure 4:
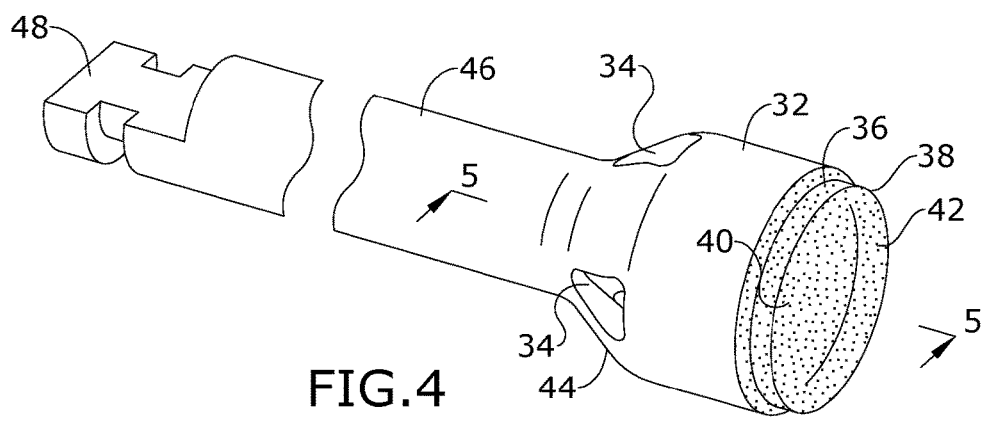
FIG. 4 is a perspective view of one embodiment of the present disclosure.

As shown in FIGS. 1-3, the shank 24 may comprise a friction fit portion 26 distal from the burr body 10, wherein the friction fit portion 26 is designed to engage with a handpiece slot 30 in a dental handpiece 28. Thus, when the dental handpiece 28 is turned on, the shank 24 and thus the burr body 10 will rotate. Alternatively, as shown in FIG. 4, the shank 46 may comprise a latch 48 on an end of the shank 46 distal from the burr body 32, wherein the latch 48 is designed to engage with a dental handpiece.

As shown in the Figures, the abrasive surface may comprise a thin layer of abrasive material applied to the indented edge, the lip, and the walls of the cavity. The abrasive material may be applied evenly over these surfaces or the abrasive material may have patterns for providing more efficient cutting and/or removal of tooth debris. Alternatively, these portions of the burr body may be made of a cutting patterned/abrasive material. In any case, the entirety of the abrasive surface may have identical abrasiveness or, alternatively, the abrasive surface may comprise different portions of texture wherein the portions may be more or less abrasive than other portions.

While not shown in the drawings, the interior of the cavity may have a contour to form the coronal end of a tooth into the desired shape. For example, the cavity may be shaped to be conical, superiorly indented-conical, smoothed frusto-conical, superiorly indented smoothed frusto-conical, thimble shaped, superiorly indented thimble shaped, pyramidal, superiorly indented pyramidal, dome shaped, superiorly indented dome-shaped, or the like to produce a corresponding and desired shape of the tooth. The sides of the internal walls of the cavity may be inclined/angled (coronal to apical aspect) from perfectly parallel to 4 degrees to 45 degrees or more. In a particular embodiment, the optimal divergence may be from about 4 to about 10 degrees. Moreover, internal corners of the cavity may be rounded to avoid forming sharp edges on the tooth, which may prevent fracture of a prepared tooth or artificial crown, or may simply be left square for later free-hand rounding with traditional dental burrs.

As shown in the Figures and as described above, the burr body may comprise a plurality of debris vents extending therethrough. While the vents may be positioned on any location of the burr body, in embodiments, they may extend through the rear body taper portion of the burr body. Additionally, while the vents may have any desired shape and size, in some embodiments, the vents have a rounded triangle shape.

Other than the indented edge and lip, an outer surface of the burr body may comprise a substantially smooth(ed) substrate or material to avoid damage to adjacent dental tissue if the device comes into contact with the adjacent tissue during use.

Figure 8:
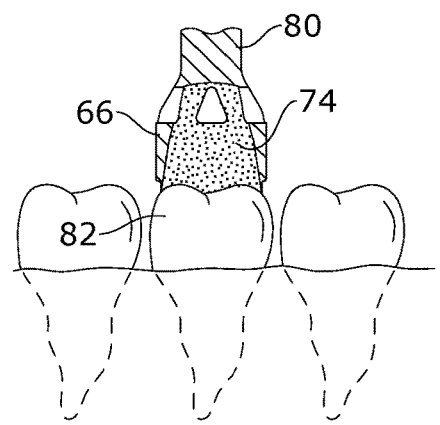
FIG. 8 is a section view of one embodiment of the present disclosure, shown in use.
Figure 9:
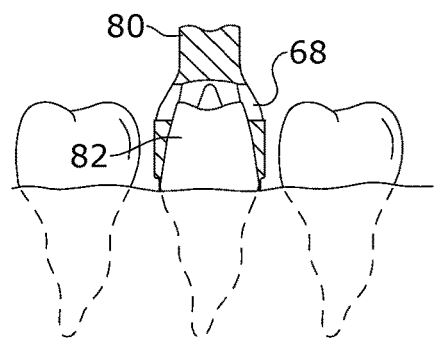
FIG. 9 is a section view of one embodiment of the present disclosure, shown in use.
Figure 10:
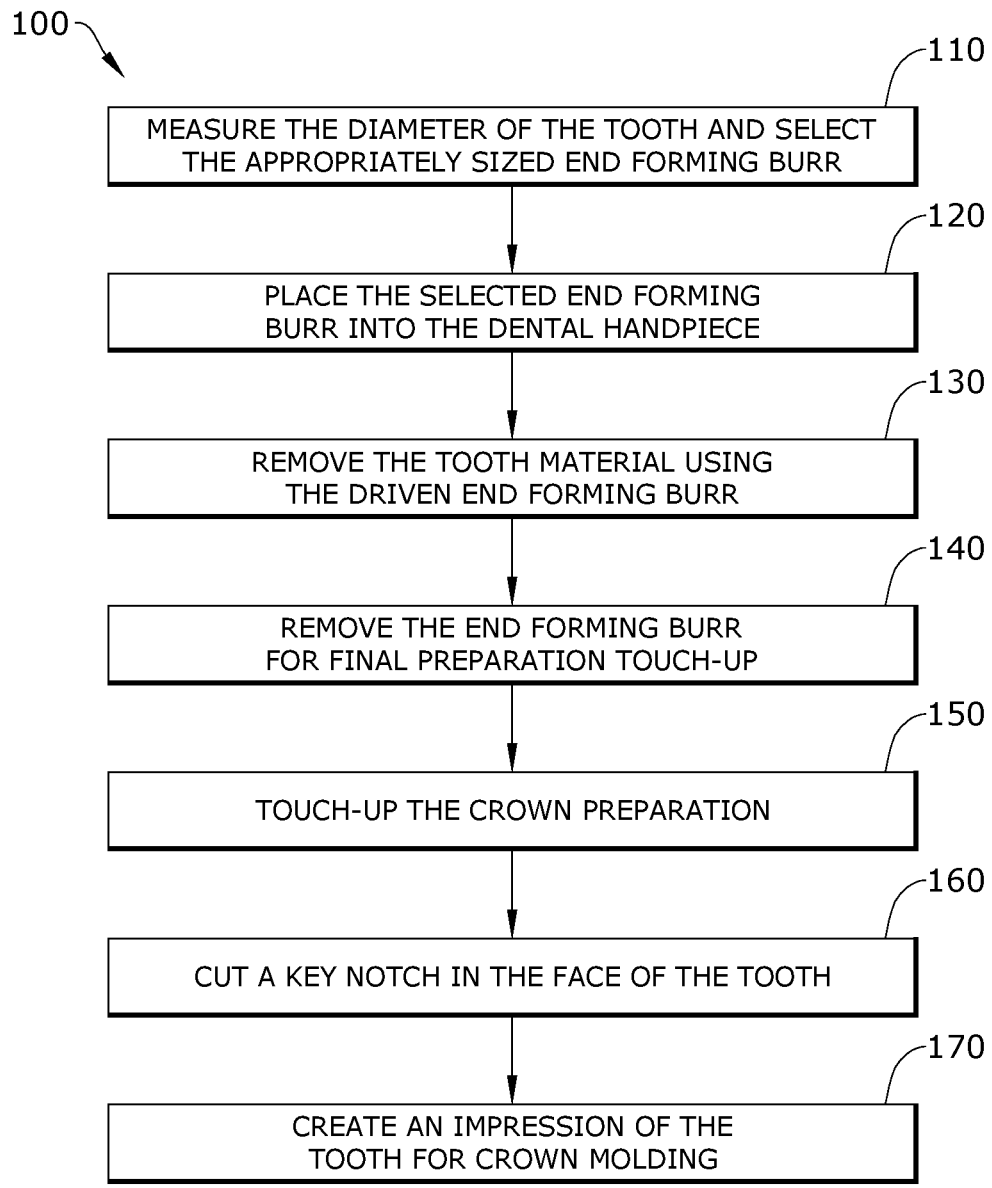
FIG. 10 is a flow chart describing use of one embodiment of the present disclosure.

As described in FIG. 10, the process 100 for using the device of the present disclosure may include the following steps. First, as described in step 110, the diameter of the tooth 82 may be measured and an appropriately sized burr may be selected. As described in step 120, the burr may be placed into the dental handpiece. As described in step 130 and as shown in FIGS. 8 and 9, the desired tooth material may be removed using the burr. Specifically, the burr may be placed onto a tooth 82 such that the cavity and the tooth are concentrically aligned. As the burr body rotates, the tooth material 82 may be shaped without impacting adjacent dental tissue, as shown in FIG. 9. As described in step 140, after the desired tooth material is removed, the burr may be removed from the tooth for final preparation touch up. As described in steps 150, 160, and 170, the crown preparation may then be touched up, a key notch may be cut in the face of the tooth, and an impression of the tooth may be made for crown fabrication.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A dental burr for preparing tooth for fabrication, the dental burr comprising:
   a shank designed to engage with a dental handpiece;
   a burr body extending from the shank, the burr body comprising:
      a lip distal from the shank, the lip defining an opening into a cavity within the burr body, the cavity being sized to accommodate a tooth; and
      an indented edge on an external surface of the burr body, the indented edge extending from the lip toward the shank,
   wherein:
      the indented edge comprises an inward constriction with a hangover perpendicular to the inward constriction;
      an exterior surface of the indented edge, the lip, and an inner surface of the cavity comprise an abrasive surface; and
      the abrasive surface comprises a thin layer of an abrasive material applied to the indented edge, the lip, and the inner surface of the cavity.

2. The dental burr of claim 1, further comprising at least one debris vent extending through the burr body.

3. The dental burr of claim 1, wherein the lip is a member selected from the group consisting of a feathered edge, a 90 degree butt margin, and a chamfer edge.

4. The dental burr of claim 1, wherein the shank comprises a friction fit portion distal from the burr body, wherein the friction fit portion is designed to engage with a handpiece slot in the dental handpiece.

5. The dental burr of claim 1, wherein the shank comprises a latch distal from the burr body, wherein the latch is designed to engage with the dental handpiece.

6. A dental burr for preparing tooth for fabrication, the dental burr comprising:
   a shank designed to engage with a dental handpiece;
   a burr body extending from the shank, the burr body comprising:
      a lip distal from the shank, the lip defining an opening into a cavity within the burr body, the cavity being sized to accommodate a tooth; and
      an indented edge on an external surface of the burr body, the indented edge extending from the lip toward the shank,
   wherein:
      an exterior surface of the indented edge, the lip, and an inner surface of the cavity comprise an abrasive surface,
      the dental burr has a longitudinal axis extending from an end of the shank designed to engage with the dental handpiece to the lip; and
      the exterior surface of the indented edge is parallel to the longitudinal axis of the dental burr.

\* \* \* \* \*